United States Patent [19]
Murasugi et al.

[11] Patent Number: 6,023,648
[45] Date of Patent: *Feb. 8, 2000

[54] ANTI-CREEP CONTROL APPARATUS FOR AUTOMATIC TRANSMISSION

[75] Inventors: Takashi Murasugi, Shizuoka; Motoharu Nishio, Yokohama; Hiromasa Sakai, Kanagawa, all of Japan

[73] Assignee: Nissan Motor Co., Ltd., Yokohama, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,106

[22] Filed: Jul. 3, 1997

[30] Foreign Application Priority Data

Jul. 3, 1996 [JP] Japan .................................... 8-173447

[51] Int. Cl.[7] ...................................................... F16H 3/02
[52] U.S. Cl. .............................. 701/68; 701/51; 701/58; 701/90; 477/93
[58] Field of Search ................................ 701/51, 58, 59, 701/62, 64, 66, 67, 68, 87, 90, 94, 95; 74/866, 867; 477/121, 93

[56] References Cited

U.S. PATENT DOCUMENTS

| | | | |
|---|---|---|---|
| 4,625,589 | 12/1986 | Nishikawa et al. ........................ | 74/856 |
| 4,953,090 | 8/1990 | Narita .................................... | 364/424.1 |
| 5,060,768 | 10/1991 | Yamashita et al. .................. | 192/0.052 |
| 5,065,849 | 11/1991 | Kono et al. ........................... | 192/0.076 |
| 5,105,675 | 4/1992 | Langford et al. ......................... | 74/335 |
| 5,272,630 | 12/1993 | Brown et al. ......................... | 364/424.1 |
| 5,449,329 | 9/1995 | Brandon et al. ........................... | 477/70 |

FOREIGN PATENT DOCUMENTS

| | | |
|---|---|---|
| 60-220260 | 11/1985 | Japan . |
| 5-157173 | 6/1993 | Japan . |

*Primary Examiner*—William A. Cuchlinski, Jr.
*Assistant Examiner*—Arthur D. Donnelly
*Attorney, Agent, or Firm*—Foley & Lardner

[57] ABSTRACT

An anti-creep control apparatus has a forward clutch control section that controls the hydraulic pressure of a forward clutch so as to slip the forward clutch when an automatic transmission is set in a drive range and the vehicle is stopped. The anti-creep control apparatus sets a target engagement time that is inversely proportional to the engine rotation speed at the time just before starting anti-creep control. The anti-creep control apparatus controls an oil pressure modulator so that one of a slip amount of the forward clutch and the output shaft rotation speed of the torque converter becomes nearly zero when the target engagement time elapses.

9 Claims, 12 Drawing Sheets

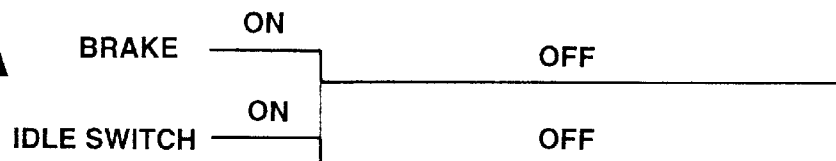
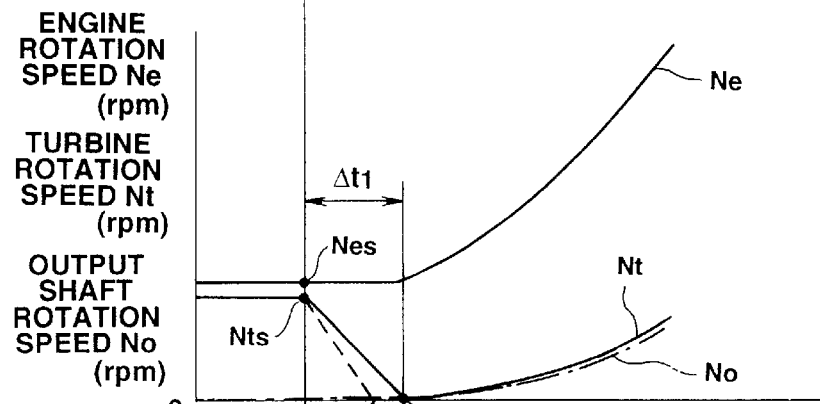
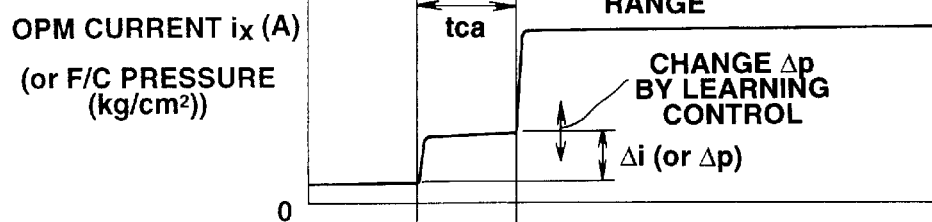
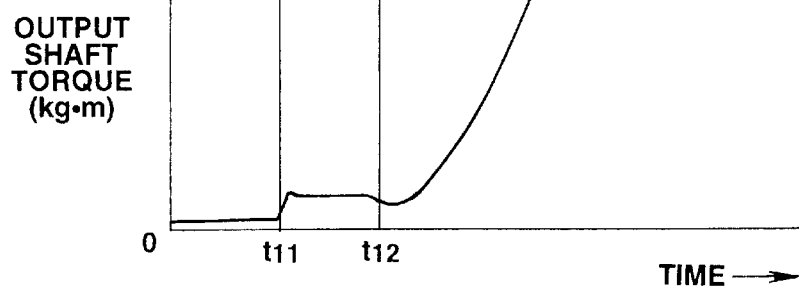

6,023,648

ANTI-CREEP CONTROL APPARATUS FOR AUTOMATIC TRANSMISSION

BACKGROUND OF THE INVENTION

The present invention relates to improvements in an anti-creep control apparatus of an automatic transmission of a vehicle.

Various anti-creep control apparatus of an automatic transmission have been proposed in order to prevent a so-called creep phenomenon that part of engine power is transmitted to an output shaft of the automatic transmission due to the rotation of the torque converter and to decrease the vibration and the energy consumption during idling of the vehicle. Japanese Patent Provisional Publication No. 60-220260 discloses a typical anti-creep control apparatus for an automatic transmission, where a friction element installed in a motive power transmitting system is controlled such that a difference between input and output shaft rotation speeds of a torque converter installed between an engine and the automatic transmission is set at a predetermined value necessary to avoid the creep of the vehicle when the automatic transmission is set in a drive range and when the engine is driven in an idling speed. On the other hand, Japanese Patent Provisional Publication No. 5-157173 discloses another typical anti-creep control apparatus of an automatic transmission, which apparatus is arranged to quickly engage a forward clutch if a driver intends to quickly start the vehicle and to slowly engage the forward clutch so as to decrease a shock in the clutch releasing operation if a driver does not intend to quickly start the vehicle.

The former conventional anti-creep control apparatus is arranged to execute the anti-creep control during a time period from the time when the shift position of the automatic transmission is changed from N-range to D-range to the time when the acceleration pedal is depressed. Therefore, just after the depression of the acceleration pedal, the forward clutch is smoothly engaged while the clutch of the automatic transmission is slipped according to the increase of the engine rotation speed. In this case, it becomes possible to ensure a smooth starting without a shock although the responsibility of the vehicle starting is degraded since the rising of output shaft torque is delayed. During this time period, the clutch is slipped while receiving large torque. Therefore, the clutch generates large amount of heat and degrades the durability thereof. On the other hand, the later conventional anti-creep control apparatus is arranged to quickly increase the hydraulic pressure of the forward clutch when intended to start the vehicle. Although the forward clutch is quickly engaged by this quick decrease of the output shaft rotation speed, the quick engagement of the forward clutch generates a torque shock impressing discomfort to a driver.

SUMMARY OF THE INVENTION

It is an object of the present invention to provide an improved anti-creep control apparatus that executes a smooth engagement of a forward clutch of an automatic transmission without generating an engagement shock, without degrading the durability of the forward clutch.

An anti-creep control apparatus according to the present invention is for an automatic transmission, which includes a torque converter connected to an engine and a friction element operating during a drive range of the automatic transmission. The anti-creep control apparatus comprises an engine output detecting section, an engine rotation speed detecting section, an output shaft rotation speed detecting section, a target engagement time setting section, and an engagement force control section. The engine output detecting section detects whether an engine throttle valve is opening from an idle position. The engine rotation speed detecting section detects a rotation speed of the engine. The output shaft rotation speed detecting section detects a rotation speed of an output shaft of the torque converter. The target engagement time setting section sets a target engagement time, which is in inverse proportion to the engine rotation speed just before the anti-creep operation starts, after the engine output detecting section detects that the engine throttle valve is opening from the idle position. The engagement force control section controls an engagement force of the friction element so that one of the slip amount of the friction element and the output shaft rotation speed of the torque converter becomes nearly zero as the set target engagement time elapses.

BRIEF DESCRIPTION OF THE DRAWINGS

FIGS. 11A to 11D are time charts for explaining the manner of operation of the second embodiment;

DETAILED DESCRIPTION OF THE INVENTION

Figure 1:
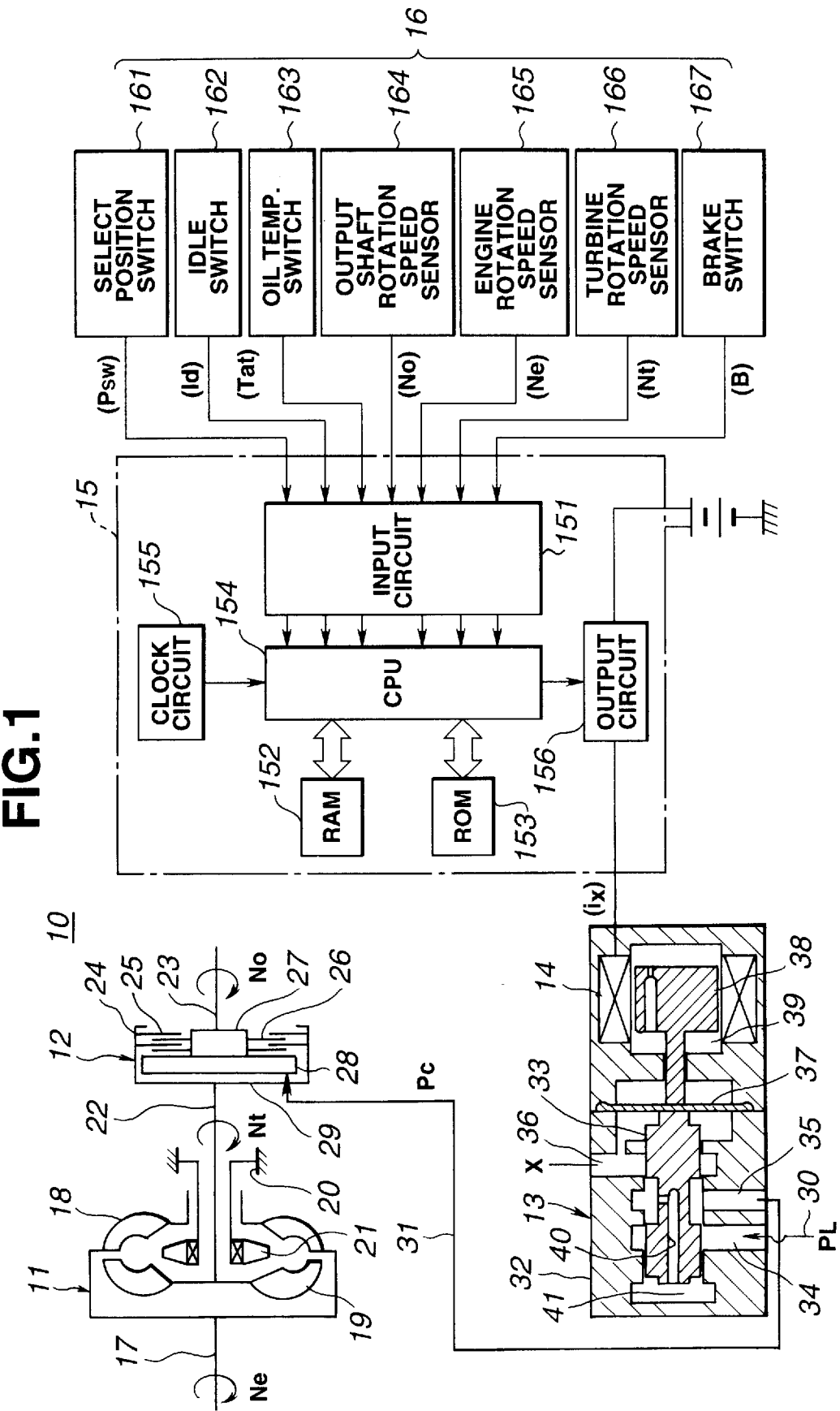
FIG. 1 is a schematic structural view showing a first embodiment of an anti-creep control apparatus of an automatic transmission in accordance with the present invention.

Referring to FIGS. 1 to 8D, there is shown a first embodiment of an anti-creep control apparatus 10 of an automatic transmission for a vehicle.

The anti-creep control apparatus 10 executes an anti-creep control in a manner to absorb transmitting torque by setting a forward clutch (start clutch) into a semi-engagement condition (absorbing the transmission torque through the slippage of the forward clutch F/W).

The anti-creep control apparatus 10 comprises a torque converter 11, a forward clutch 12, an oil pressure modulator 13, a solenoid (actuator) 14, a control unit 15, and an input sensor unit 16.

The torque converter 11 is a kind of a hydraulic power transmission device that transmits a rotational drive force of an engine (not shown) by amplifying function thereof until the rotation speed of the engine reaches a predetermined rotation speed. The torque converter 11 is constituted by a pump impeller 18 which is connected with a drive input shaft 17 receiving the rotational drive force of the engine, a turbine runner 19 to which the drive force from the pump impeller 18 is transmitted through fluid, and a stator 21, which is fixed to a transmission case 20 through a one-way clutch (not shown). The turbine runner 19 is connected with a drive force output shaft 22.

The forward clutch 12 is one of friction elements for a gear train including a planetary gear unit of the automatic transmission. The forward clutch 12 is a wet type multi-plate clutch held in the engaged condition when the automatic transmission is set in a drive shift position. The forward clutch 12 is constituted by a clutch drum 24 which is connected with a drive output shaft (transmission input shaft) 22, clutch plates 25 which are disposed in and splined to the clutch drum 24, clutch plates 26, which are alternatively arranged with the clutch plates 25, a clutch hub 27 in which the clutch plates 27 are splinedly disposed, a clutch piston 28 installed to the clutch hub 27, and a piston chamber 29 to which controlled hydraulic pressure (forward clutch hydraulic pressure) Pc for operating the clutch piston 28 is supplied. The clutch hub 27 is interconnected with a transmission output shaft 23 through a gear train (not shown).

The oil pressure modulator (OPM) 13 is disposed in a line pressure passage 30 for supplying a line pressure PL generated by controlling the discharged pressure of an oil pump (not shown) by means of a pressure regulator valve (not shown). The OPM 13 is connected with the piston chamber 29 of the forward clutch 12 through the hydraulic passage 31. The OPM 13 is an electromagnetic solenoid valve of a proportional type in which a spring force of a pressure reducing valve is replaced by the electromagnetic force of the solenoid 14 and increases the output port pressure according to an OPM electric current $i_x$ applied to the solenoid 14 so as to perform the characteristics shown in FIG. 5. The OPM 13 comprises a valve body 32 in which a spool 33, a control pressure input port 34, a control pressure output port 35, a drain port 36, a diaphragm 37, a spool operation piston 38, an air chamber 39, a communication passage 40, a pressure oil chamber 41 and a solenoid 14 are disposed. The OPM 13 is arranged such that the spool 33 is moved at a position where the electromagnetic force of the solenoid 14 (a force pushing the spool 33 to the left hand side in FIG. 1) is balanced with the hydraulic pressure force (a force pushing the spool 33 to the right hand side in FIG. 1).

The control unit 15 is a microcomputer, which includes an input circuit 151, RAM (random access memory) 152, ROM (read only memory) 153, CPU (central processing unit) 154, a clock circuit 155, and an output circuit 156. The input circuit 151 changes input signals sent from sensors of the sensor unit 16 and converts them into digital signals so as to be able to be processed by the CPU 154. The converted digital signals are sent from the input circuit 151 to the CPU 154. The RAM 152 is a random access memory from and in which information, such as the input signals of the sensors and the calculated data, is read and written by the CPU 154. The ROM 153 previously stores information necessary for the processing in the CPU 154 and is accessed with the CPU 154 according to the demand from the CPU 154. The CPU 154 executes a calculation process according to the predetermined processing condition of the various input information. The CPU 154 executes the processing of the input information in the anti-creep control and the forward clutch control. The clock circuit 155 sets the operation time of the CPU 154. The output circuit 156 outputs a control current signal $i_x$ to the solenoid 14 according to the calculated signal from the CPU 154.

The input sensor unit 16 includes a select position sensor 161, an idle switch 162, an oil temperature sensor 163, an output shaft rotation-speed sensor (an output shaft rotation-speed detecting means which may be replaced by a vehicle speed sensor) 164, an engine rotation speed sensor (engine rotation-speed detecting means) 165, a turbine rotation-speed sensor 166, and a brake switch 167.

The select position sensor 161 outputs a switch signal indicative of a selected range of the automatic transmission (a select position). More particularly, when the selected range is a neutral range (N-range), the select position switch 161 is turned ON. Only when the selected range is a drive range (D-range), the select position switch 161 is turned OFF and outputs the switch signal Psw to the input circuit 151. The switch signal Psw output from the select position switch 161 indicates that the selected shift range of the automatic transmission is changed from N-range to D-range (N→D). The switch signal Psw is used as a signal for deciding a start time of the supply of the line pressure. The idle switch 162 detects as to whether a throttle valve of the engine is fully closed or not, that is, whether the engine is put in an idle condition or not. When the throttle valve is open, the idle switch 162 is turned OFF. Only when the throttle valve is put in a full close condition, the idle switch 162 is turned ON and outputs a switch signal Id. Since the idle switch 162 is turned OFF when the throttle opening degree of the engine is greater than a predetermined value, the idle switch 162 functions as an engine output detecting means. It will be understood that the idle switch 162 may be replaced by a throttle sensor. The oil temperature sensor 163 detects temperature of the automatic transmission fluid (ATF temperature) and outputs an oil temperature signal Tat. The output shaft rotation speed sensor 164 detects an output shaft rotation speed No of the automatic-transmission output shaft 23. The signal No output from the output-shaft rotation speed sensor 164 is used as a signal indicative of a vehicle speed. The engine rotation-speed sensor 165 detects a rotation speed (engine rotation speed) Ne of the drive-force output shaft 17 and outputs an engine rotation speed signal Ne. The turbine rotation-speed sensor 166 detects a rotation speed (turbine rotation speed) Nt of the drive output shaft 22 and outputs a turbine rotation-speed signal Nt. The control unit 15 calculates a rotation-speed difference between the engine rotation-speed Ne and the turbine rotation-speed Nt on the basis of the engine rotation-speed signal Ne and the turbine rotation-speed signal Nt. The brake switch 167 is disposed in the vicinity of a brake pedal and detecting an operation of a foot brake or side brake. When the brake is operated, the brake switch 167 outputs a brake operation signal B.

Next, the anti-creep control of the anti-creep control apparatus of the first embodiment according to the present invention will be discussed hereinafter.

Figure 2:
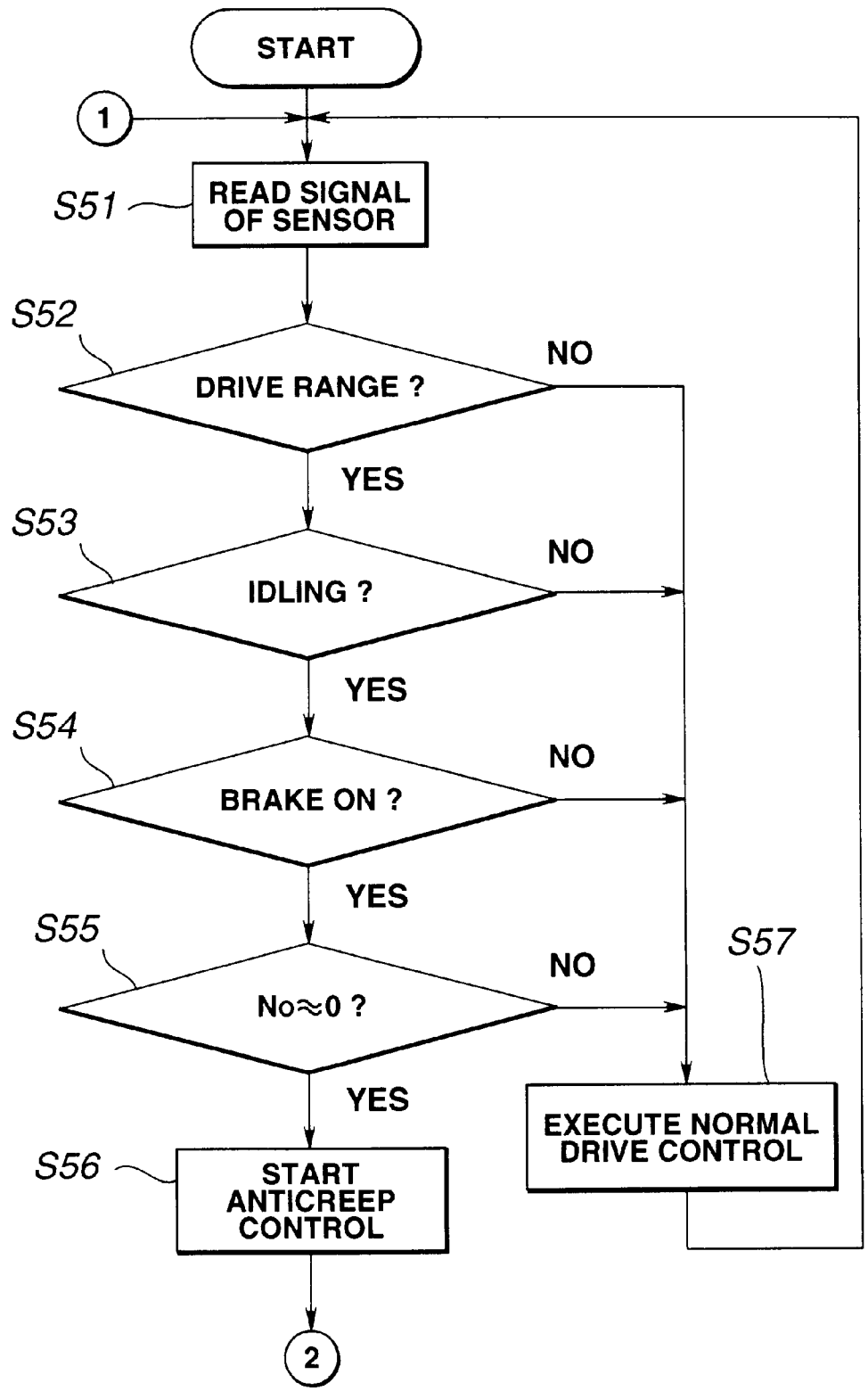
FIG. 2 is a part of a flowchart showing a control program of an anti-creep control executed by the anti-creep control apparatus of FIG. 1.
Figure 3:
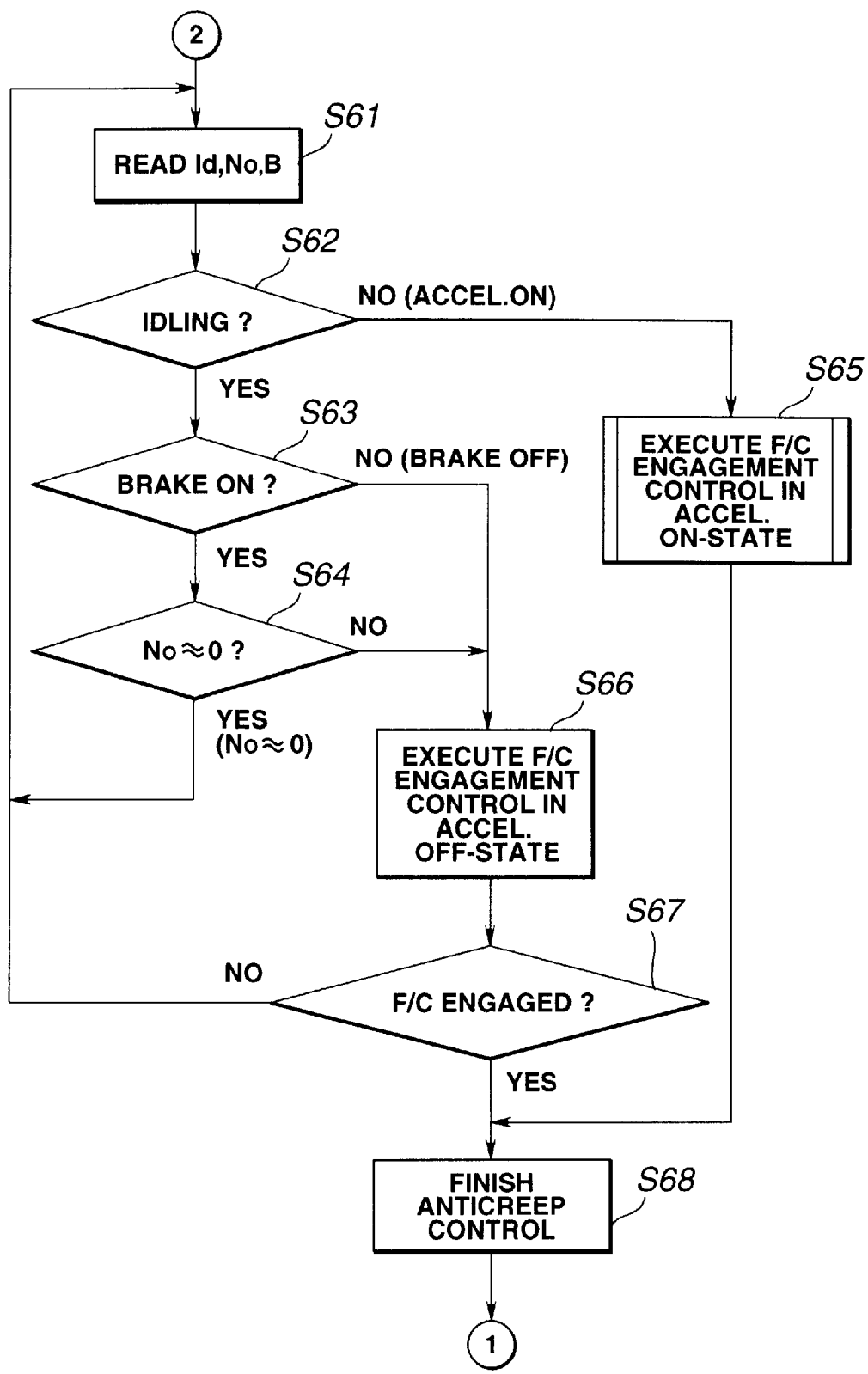
FIG. 3 is the other part of the flowchart showing a control program of an anti-creep control executed by the anti-creep control apparatus of FIG. 1.

FIGS. 2 and 3 show a series of flowcharts indicative of a control program of a main routine of the anti-creep control.

At a step S51, the control unit 15 receives the signals Psw, Id, No, and B from the corresponding sensors 161, 162, 164, and 167.

At a step S52, the control unit 15 decides as to whether the select range of the automatic transmission is the drive range (D-range) or not according to the signal Psw. When the select range is D-range, the routine proceeds to a step S53. When it is not D-range, the routine proceeds to a step S57 wherein a normal drive control is executed.

At the step S53, the control unit 15 decides as to whether the engine is put in the idle condition or not, on the basis of the signal Id. When the decision at the step S53 is YES, the routine proceeds to a step S54. When the decision at the step S53 is NO, the routine proceeds to the step S57 wherein the normal drive control is executed.

At the step S54 the control unit 15 decides according to the signal B as to whether the brake is operated or not, that is, as to whether the brake switch 167 is turned ON or not. When the decision at the step S54 is YES, the routine proceeds to a step S55. When the decision as the step S54 is NO, the routine proceeds to the step S57.

At the step S55 the control unit 15 decides as to whether the vehicle speed No is generally zero or not on the basis of the output shaft rotation-speed signal No. When the decision at the step S55 is YES, the routine proceeds to a step S56 wherein the anti-creep control is executed. When the decision at the step S55 is NO, the routine proceeds to the step S57.

That is, the anti-creep control is executed only when the vehicle satisfies all of four conditions that the automatic transmission is put in the drive range, the engine is put in the idle condition, the brake is operated, and the vehicle speed is generally zero. In other situations of the vehicle, the normal drive control is executed. During the executing of the step S56, the control unit 15 functions as an anti-creep control means. After the execution of the step S56, the routing proceeds to a step S61 in a flowchart of FIG. 3.

At the step S61, the control unit 15 reads the signals Id, No, and B from the idle switch 162, the output shaft rotation-speed sensor 164, and the brake switch 167, respectively.

At the step S62, the control unit 15 decides on the basis of the signal Id as to whether the engine is put in the idle condition or not. When the decision at the step S62 is YES, the routine proceeds to a step S63. When the decision at the step S62 is NO, the routine proceeds to a step S65 wherein a forward-clutch engagement control in an acceleration-pedal ON-state is executed.

At the step S63, the control unit 15 decides on the basis of the signal B as to whether the brake is operated or not, that is, as to whether the brake switch 167 is turned ON or not. When the decision at the step S63 is YES, that is, when the brake is operated, the routine proceeds to a step S64. When the decision at the step S63 is NO, the routine proceeds to a step S66 wherein a forward-clutch engaging control in an acceleration-pedal OFF-state is executed.

At the step S64, the control unit 15 decides on the basis of the vehicle speed signal No as to whether the vehicle speed is nearly zero or not. When the decision at the step S64 is YES, the routine returns to the step S61. When the decision at the step S64 is NO, the routine proceeds to the step S66.

That is, in a condition that the anti-creep control is now been executed and the engine is put in the idle condition, when the brake is not operated and when the vehicle speed No is greater than 0 (No>0), the forward clutch engagement control in acceleration-pedal OFF state is executed to slowly engage the forward clutch 12. The forward clutch engagement control is repeated until the control unit 15 decides at the step S67 that the engagement of the forward clutch 12 is achieved. The decision of this achievement of the forward clutch engagement is executed by comparing the turbine rotation speed Nt and the output shaft rotation speed No. More particularly, when the difference (Nt−No) between the turbine rotation speed Nt and the output shaft rotation speed No becomes nearly zero, the control unit 15 decides that the engagement of the forward clutch 12 is achieved.

When the decision at the step S67 is YES, the routine proceeds to a step S68 wherein the anti-creep control is finished.

Next, the detailed explanation of the forward clutch engagement control in the acceleration-pedal ON state, which is executed at the step S56 in case that the acceleration pedal is depressed (acceleration ON) during the anti-creep control, will be discussed hereinafter with reference to FIG. 4.

Figure 4:
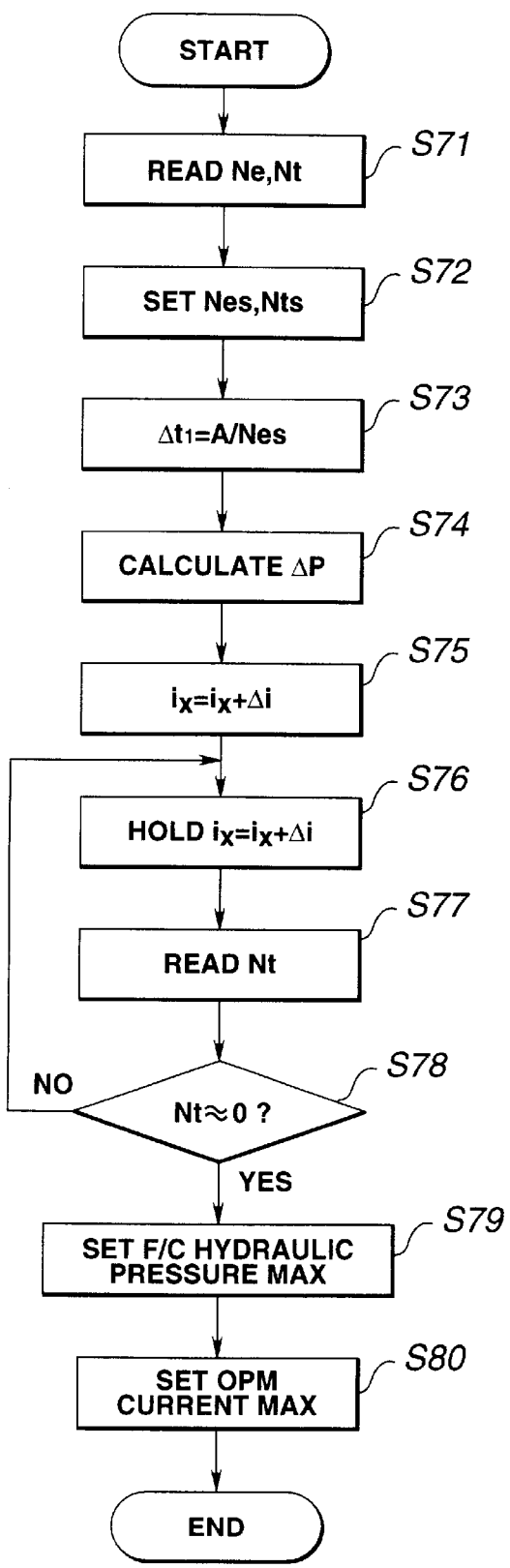
FIG. 4 is a flowchart showing a control program of a forward clutch engagement control during an accelerator ON-state of the first embodiment.
Figure 5:
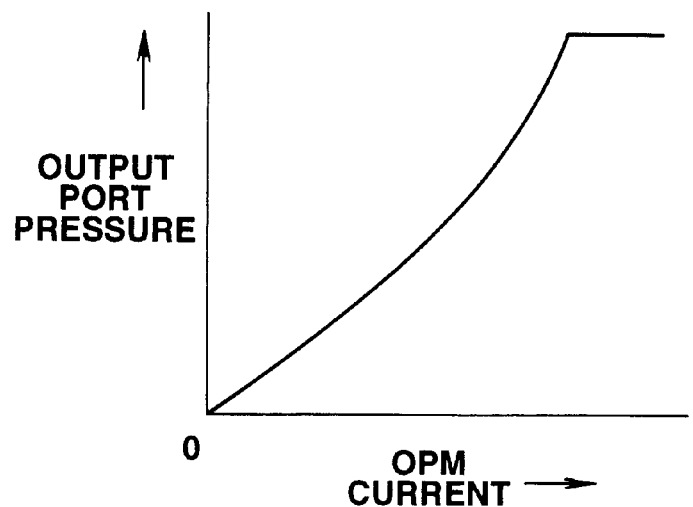
FIG. 5 is a graph showing a relationship between an oil pressure modulator (OPM) electric current and an output port pressure are adapted in the first embodiment.

FIG. 4 shows a flowchart representative of a control program of the forward clutch engagement control in the acceleration-pedal ON-state.

At a step S71, the control unit 15 reads the engine rotation speed Ne and the turbine rotation speed Nt from the corresponding sensors 165 and 166.

At a step S72, the control unit 15 sets an engine rotation speed Nes just before the starting operation, i.e., at H1 and a turbine rotation speed Nts just before the starting operation.

At a step S73, the control unit 15 executes a calculation of the engagement target time period $\Delta t1$ using the equation $\Delta t1 = A/\text{Nes}$, where A is a constant indicative of a time period corresponding to one cycle process (including intake-process, compression-process and explosion-process) of the engine.

At a step S74, the control unit 15 calculates a target shelf pressure $\Delta P$. In taking account that the target shelf pressure $\Delta P$ is in proportion with the sum of the inertia intake torque of turbine system and the torque-converter stool torque, this calculation of the target shelf pressure $\Delta P$ is executed by using the following equation (1):

$$\Delta P = (It \times Nts/\Delta t1 + ts \times \tau s \times Nes^2) \times B \tag{1}$$

where It is a turbine inertia of the automatic transmission, ts is a stool torque ratio of the torque converter, $\tau s$ is a stool torque capacity coefficient of the torque converter, and B is a constant, and C is a constant corresponding to the return pressure.

Figure 6:
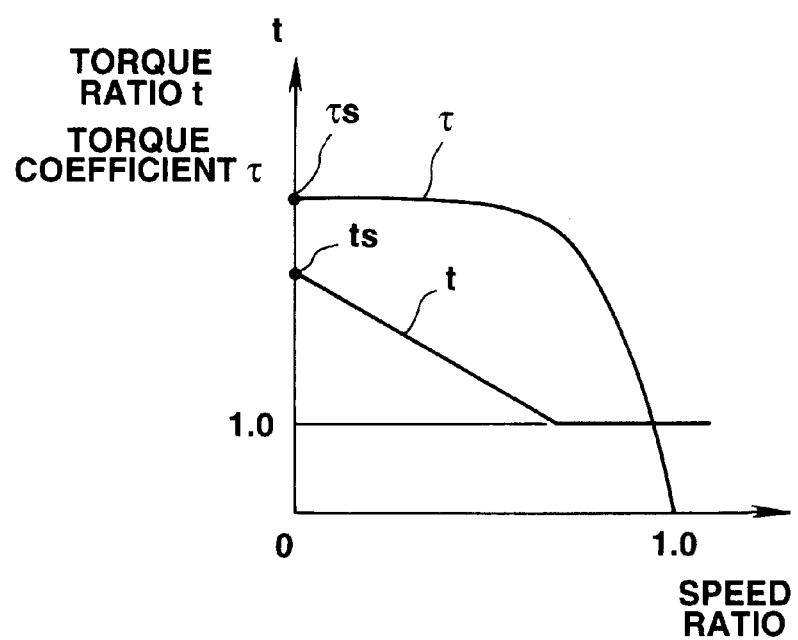
FIG. 6 is a graph showing characteristic curves of a torque ratio and a torque capacity with respect to a speed ratio of the torque converter of the first embodiment.

FIG. 6 shows a characteristic curve between the stool torque ratio ts and the stool torque capacity coefficient $\tau s$.

At a step S75, the OPM electric current $i_x$ is incremented by $\Delta i$ corresponding to the $\Delta P$ (ix=ix+$\Delta i$). The calculated OPM electric current $i_x$ is hold at a step S76.

At a step S77, the control unit 15 reads the turbine rotation speed Nt.

At a step S78, the control unit 15 decides on the basis of the detected turbine rotation speed Nt as to whether the turbine rotation speed Nt is nearly zero or not. When the decision at the step S78 is YES (Nt~0), the routine proceeds to a step S79. When the decision as the step S78 is NO, the routine returns to the step S76 and executes holding the OPM electric current $i_x$.

At the step S79, the control unit 15 sets the forward clutch hydraulic pressure to a maximum value.

At a step S80, the control unit 15 sets the OPM electric current $i_x$ to a maximum value.

During the execution of the step S73, the control unit 15 functions as a target engagement time setting means, and during the execution of the step S79, the control unit 15 functions as an engagement force controlling means.

Next, the manner of operation of the anti-creep control apparatus according to the present invention will be discussed hereinafter with reference to FIGS. 7A to 7D and 8A to 8D.

Figure 7A:
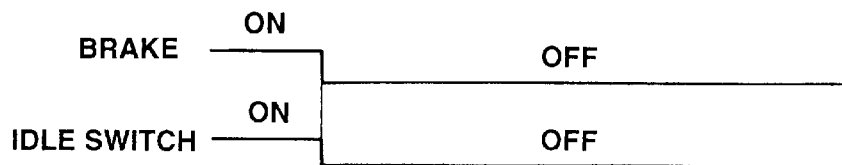
FIGS. 7A to 7D are time charts for explaining the manner of operation of the first embodiment.
Figure 7B:
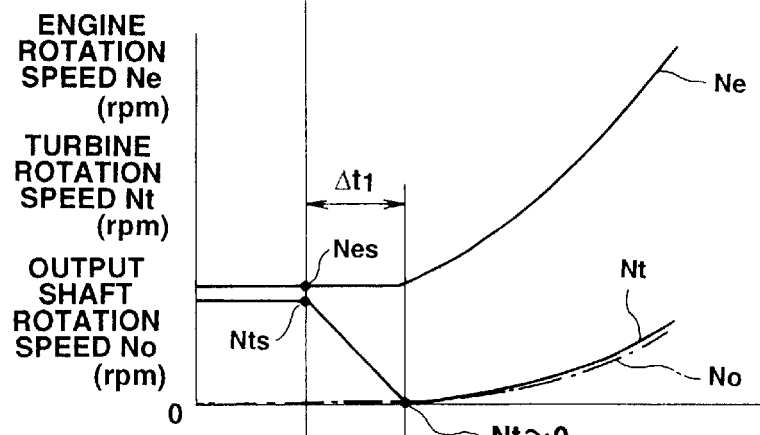
Figure 7C:
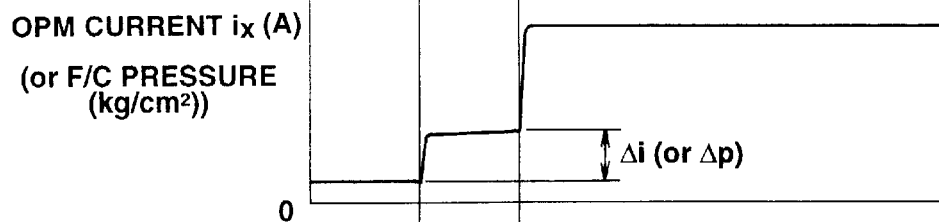
Figure 7D:
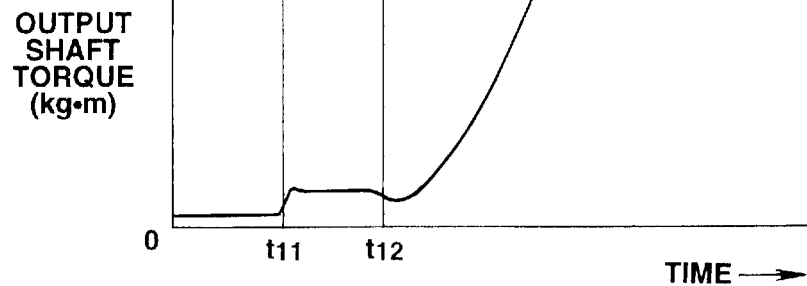

Before the starting operation (before a moment t11), the brake is set in ON state and the acceleration pedal is set in OFF state (the idle switch is turned ON) as shown in a time chart of FIG. 7A. During this period, the engine rotation it speed Ne takes a value nearly equal to the idling rotation speed, and the turbine rotation speed Nt becomes slightly smaller than the engine rotation speed Ne. Further, the output-shaft rotation speed No becomes nearly zero. Therefore, the OPM electric current $i_x$ (or forward clutch hydraulic pressure) and the output shaft torque become the predetermined values nearly equal to zero.

At the moment t11, the staring operation is executed, that is, the acceleration pedal is depressed. When the idle switch 162 and the brake switch 167 are turned OFF, by the execution of the step S72 the engine rotation speed Ne and the turbine rotation speed Nts are set at Nes and Nts, respectively.

Further, by the execution of the step S73, the engagement target time $\Delta t1$ is determined, and the target shelf pressure $\Delta P$ is determined on the basis of Nes and Nts by the execution of the step S74. The target engagement time $\Delta t1$ is a time period corresponding to a time lag from the turned-OFF of the idle switch 162 to a time that the engine rotation speed Ne is increased. For example, in case that an engine of an idle rotation speed is 650 rpm, the engagement target time $\Delta t1$ is about 150 msec. ($\Delta t1 \sim 150$ msec.). The target shelf pressure $\Delta P$ generally corresponds to the sum of the inertia absorbed amount of the input rotation member (mainly turbine) of the automatic transmission and the static input torque after the engagement of the forward clutch 12 (torque converter stool torque). By applying the OPM electric current $i_x$ ($i_x = i_x + \Delta i$) so that the forward clutch hydraulic pressure becomes the value $P + \Delta P$, the forward clutch 12 is fully engaged at a moment t12, which is the time moment when the target engagement time $\Delta t1$ elapsed from the moment t1 as shown in FIGS. 7A to 7D. In this case, the engagement target time $\Delta Nc$ of the forward clutch corresponding to the slip amount of the forward clutch 12 is obtained by the equation $\Delta Nc = Nt - No$. At a starting moment of the vehicle, the output shaft rotation speed No becomes generally zero (No~0), and $\Delta Nc$ is nearly Nt ($\Delta Nc \sim Nt$). Therefore, at the moment t12 the turbine rotation speed Nt becomes nearly zero (Nt~0).

Figure 8A:
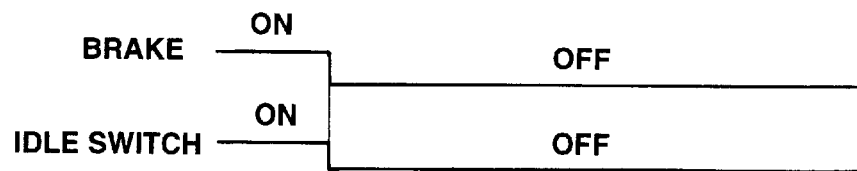
FIGS. 8A to 8D are time charts for explaining the manner of operation of the first embodiment.
Figure 8B:
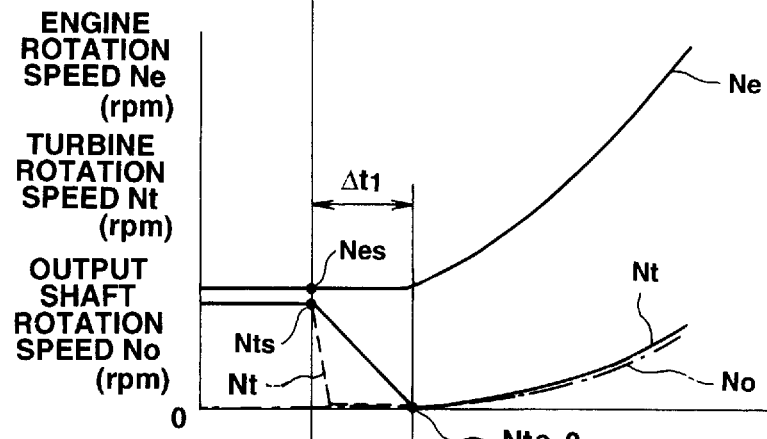
Figure 8C:
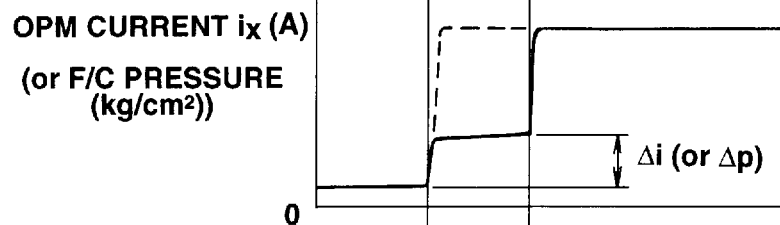
Figure 8D:
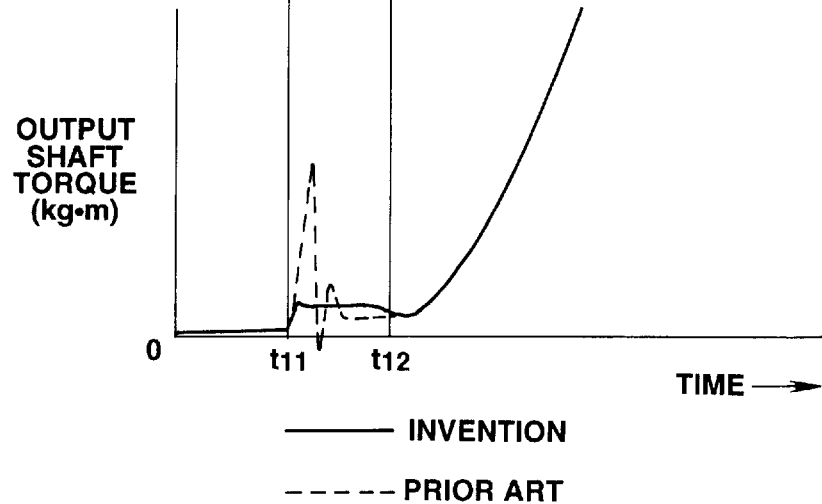

In contrast, in a case of the later conventional art mentioned in the background of the invention, since the OPM electric current is radically increased just after the starting operation, a torque shock of the output shaft torque is generated as shown by a dotted line of FIGS. 8B to 8D. On the other hand, in the former case of the conventional art mentioned in the Background, since the engagement of the forward clutch is executed by using a period that is longer than the target engagement time $\Delta t1$ of the present embodiment, a time lag form the raising of the output shaft torque though the torque shock of the output shaft torque is suppressed. Thus, if the time period for engaging the forward clutch is too long or small, some troubles are generated therein.

With the first embodiment of the anti-creep control apparatus according to the present invention, by applying the OPM electric current $i_x = i_x + \Delta i$ which increases the forward clutch hydraulic pressure by the target shelf pressure at the time just after the starting operation, the forward clutch 12 is engaged during the time period between those of the above mentioned two conventional arts. The time lag $\Delta t1$ of about 150 msec. is used for starting the increasing of the engine rotation speed Ne from the starting operation by the depression of the acceleration pedal. Therefore, even if the engagement of the forward clutch 12 is executed for a shorter time period, the raising up of the output shaft torque is not quickened, but it invites the torque shock. Therefore, by accomplishing the engagement of the forward clutch 12 by using the engagement target time $\Delta t1$, the time period for the engagement of the forward clutch 12 is optimized, such that the output shaft torque is smoothly changed during the time period between the moments t11 and t12 as described by the continuous lines of FIGS. 7D and 8D. Further, the lines of the output shaft torque were formed so as to perform a raising-up characteristic without generating time lag. Further, according to the present embodiment, since the engagement of the forward clutch 12 is accomplished before the input torque of the automatic transmission is increased, the heating value of the forward clutch becomes small and therefore the durability of the forward clutch is improved.

Figure 9:
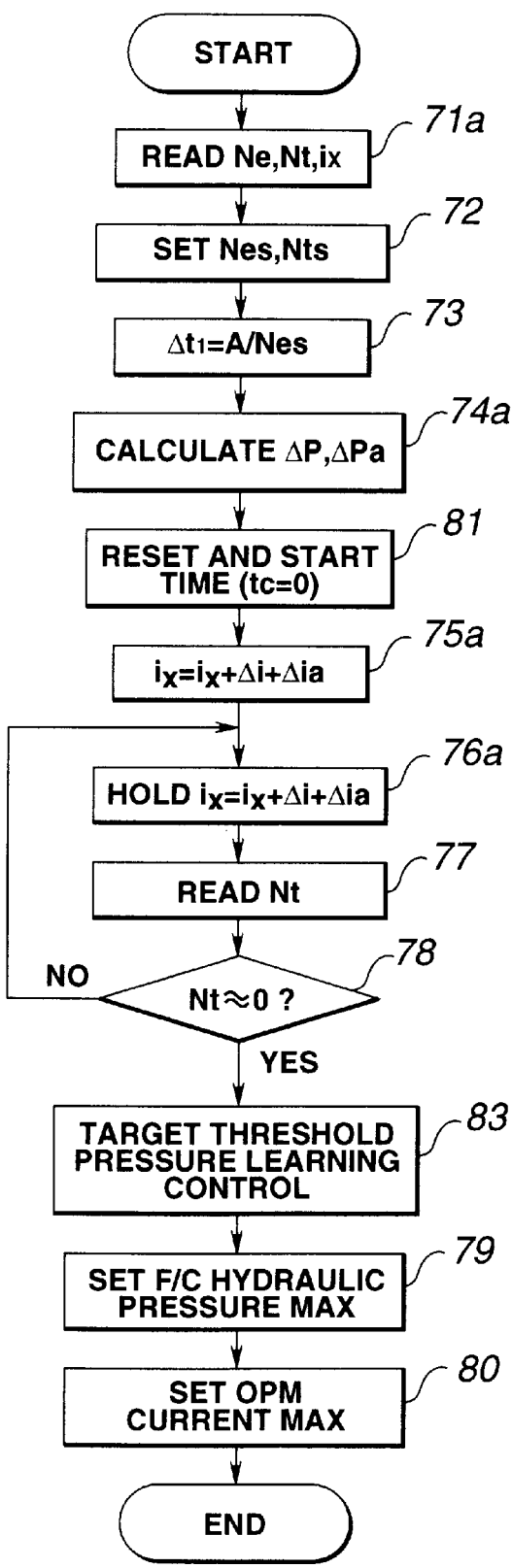
FIG. 9 is a flowchart showing a control program of a forward clutch engagement control during an accelerator ON state of a second embodiment.
Figure 10:
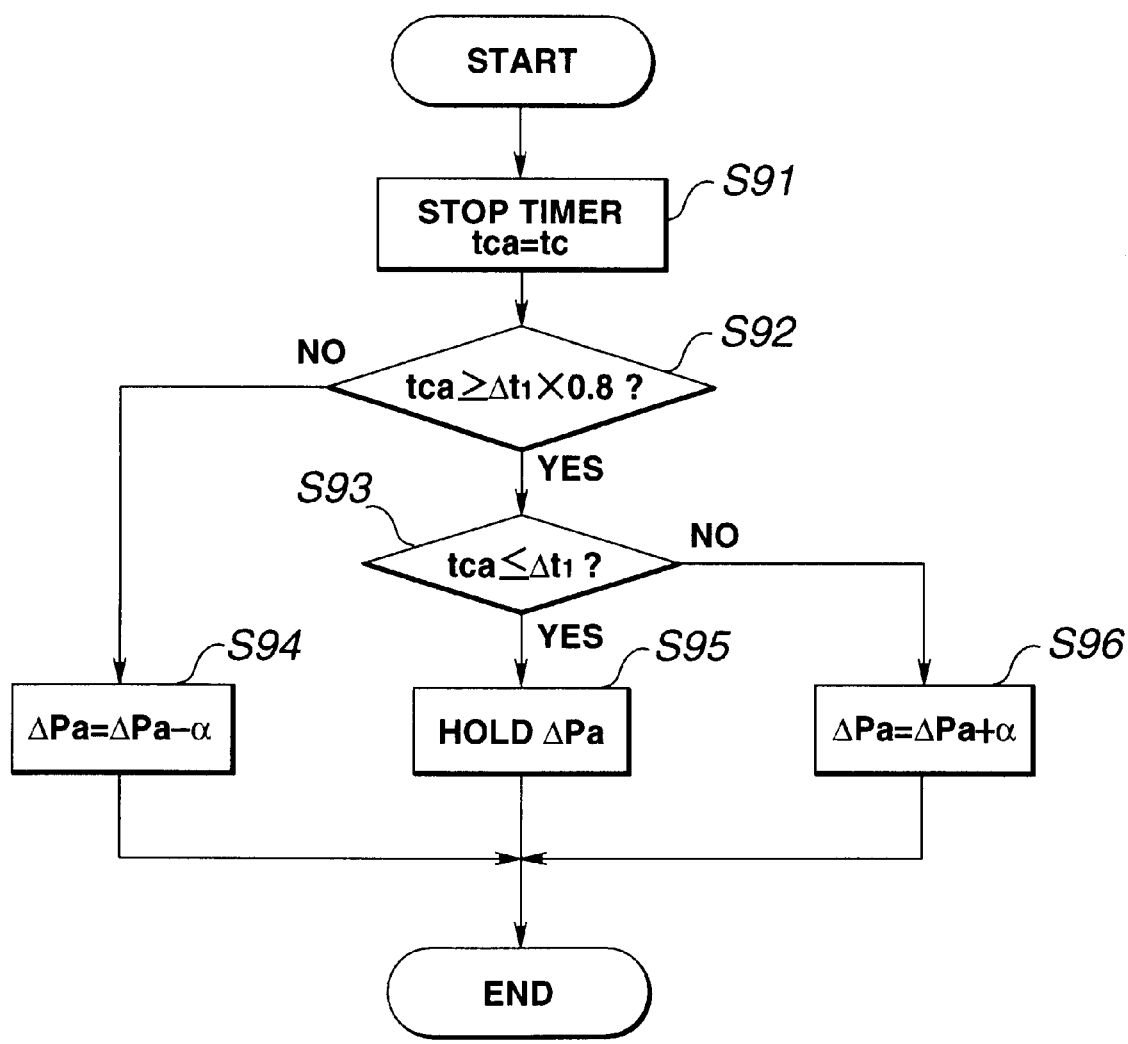
FIG. 10 is a flowchart showing a control program of a forward clutch engagement control during an accelerator ON state of the second embodiment.

Referring to FIGS. 9 and 10, a forward clutch control in acceleration-pedal ON-state of a second embodiment of the anti-creep control apparatus according to the present invention will be discussed. The construction of the hardware of the third embodiment is the same as that of the first embodiment shown in FIG. 1.

The forward clutch engagement control shown in a flow-chart of FIGS. 9 and 10 includes a learning control of forward clutch control pressure in addition to the forward clutch engagement control of the first embodiment. In FIGS. 9 and 10, steps as same as those of first embodiment are designated by the same reference numerals, and the explanation thereof are omitted herein.

At a step 71a in a control program shown in FIG. 9, the control unit 15 reads the OPM electric current value $i_x$ during the anti-creep control in addition to the engine rotation speed Ne and the turbine rotation speed Nt.

After the execution of the steps S72 and S73, which is the same as that in the first embodiment, the routine proceeds to a step S74a, where the control unit 15 calculates a correction amount $\Delta Pa$ of the target shelf pressure $\Delta P$ in addition to the calculation of the target shelf pressure $\Delta P$ of the step S74 of FIG. 4.

Following the execution of the step S74a, the routine proceeds to a step S81, where the control unit 15 resets a timer tc for detecting the engagement time period of the forward clutch 12 and start it.

At a step S75a, the control unit 15 calculates the OPM electric current $i_x$ by adding the electric current $\Delta i$ corresponding to the $\Delta P$ and an electric current $\Delta ia$ corresponding to the correction amount $\Delta Pa$ to the OPM electric current ix during the anti-creep control ($i_x = i_x + \Delta i + \Delta ia$).

At a step S76a, the control unit 15 holds the OPM electric current $i_x$ calculated at the step S75a.

Following to the execution of the step S76a, the control unit 15 executes the steps S77 and S78 as same as that in the first embodiment. When the decision at the step S78 is YES, the routine proceeds to the step S83 where the control unit 15 executes the learning control of the target shelf pressure $\Delta P$, which control is shown in FIG. 10. When the decision at the step S78 is NO, the routine returns to the step S76a to repeat the steps S76a, S77 and S78 until the decision at the step S78 becomes YES.

After the execution of the step S83, the routine proceeds to the step S79 and the step S80, which are the same as those in the first embodiment.

Referring to a flowchart of FIG. 10, the procedure of the learning control of the target shelf pressure will be discussed.

At a step S91, the control unit 15 stores the timer count value tc at the time when the control unit 15 decides that the full engagement of the forward clutch 12 is accomplished as a count finish value tca (tca=tc).

At a step S92, the control unit 15 decides as to whether the count finish value tca is greater than or equal to 80% of the target engagement time $\Delta$t1. When the decision at the step S92 is YES (tca<$\Delta$t1×0.8), the routine proceeds to a step S93. When the decision at the step S92 is NO (tca$\geq$$\Delta$t1×0.8), the routine proceeds to a step S94.

At a step S93, the control unit 15 decides as to whether the count finish value tca is smaller than or equal to the target engagement time $\Delta$t1. When the decision at the step S93 is YES (tca$\leq$$\Delta$t1), the routine proceeds to a step S95. When the decision at the step S93 is NO (tca<$\Delta$t1), the routine proceeds to a step S96.

At a step S94, the control unit 15 changes the correction amount $\Delta$Pa to a value ($\Delta$Pa=$\Delta$Pa−$\alpha$) obtained by subtracting a predetermined value $\alpha$ from the present correction amount $\Delta$Pa since the actual count finish value tca becomes smaller than 80% of the target engagement time $\Delta$t1.

At the step S95, the control unit 15 holds the present correction amount $\Delta$Pa since the actual count finish value tca is in the range from 80% to 100% of the target engagement time $\Delta$t1.

At the step S96, the control unit 15 changes the correction amount $\Delta$Pa to a value ($\Delta$Pa=$\Delta$Pa+$\alpha$) obtained by adding the predetermined value $\alpha$ from the present correction amount $\Delta$Pa since the actual count finish value tca becomes greater than the target engagement time $\Delta$t1.

Next, the manner of operation of the second embodiment of the anti-creep control apparatus according to the present invention will be discussed hereinafter. Only the different points from the first embodiment will be discussed with reference to a time chart of FIGS. 11A to 11D. The construction of the hardware of the third embodiment is the same as that of the first embodiment.

The second embodiment is arranged such that the timer tc for detecting the engagement time of the forward clutch 12 is provided and the timer count value tc at the decision time (Nt~0) of the forward clutch full engagement is stored as the count finish value tca. The control unit 15 decides as to whether the actual forward engagement time is in the range from 80% to 100% of the target engagement time $\Delta$t1. That is, when the control unit 15 decides that the forward clutch engagement time determined by the count finish value tca is out of a range from 80% to 100% of the target engagement time $\Delta$t1 shown in FIG. 11B, it is decided that the forward clutch engagement time is in the allowable range. When the control unit 15 decides that the actual forward clutch engagement time is out of the allowable range, the correction amount $\Delta$Pa is corrected by the learning correction such that the actual forward clutch engagement time becomes in the range from 80% to 100% of the target engagement time $\Delta$t1. As a learning correction, when the actual forward clutch engagement time is smaller than the allowable range, the correction electric current $\Delta$ia of the OPM electric current $i_x$ is decreased by the predetermined value $\alpha$ so that the target shelf pressure correction amount $\Delta$Pa functions to decrease the target shelf pressure $\Delta$P. When the actual forward clutch engagement time is greater that the allowable range, the correction electric current $\Delta$ia of the OPM electric current $i_x$ is increased by the predetermined value a so that the target shelf pressure correction amount $\Delta$Pa functions to increase the target shelf pressure $\Delta$P.

With the second embodiment of the anti-creep control apparatus according to the present invention, in addition to ensuring the advantages of the first embodiment, it becomes possible to control the forward clutch engagement time within the allowable range by absorbing the deviation of the forward clutch engagement time caused by the deviation of the friction coefficient $\mu$ of the forward clutch 12 since the target shelf pressure $\Delta$P is changed as shown by arrows in FIG. 11C by means of the learning control of the target shelf pressure.

Figure 12:
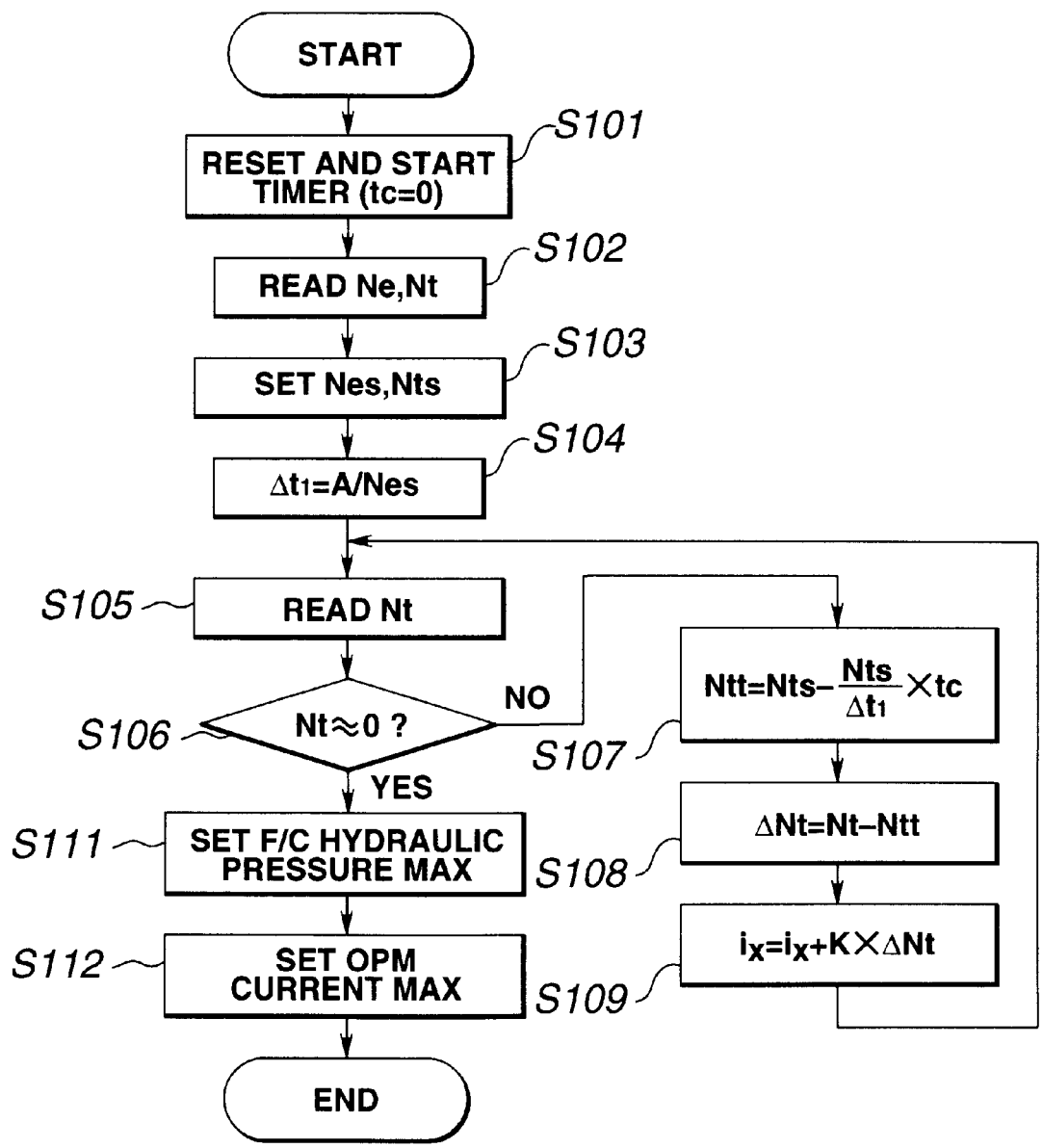
FIG. 12 is a flowchart showing a control program of a forward clutch engagement control during the accelerator ON-state of a third embodiment.

Referring to FIG. 12, there is shown a control procedure of a third embodiment of the anti-creep control apparatus according to the present invention. The construction of the hardware of the third embodiment is the same as that of the first embodiment shown in FIG. 1. The control procedure shown in a flowchart of FIG. 12 is generally similar to the control of the first embodiment except that a feedback control is executed.

At a step S101 in the flowchart of FIG. 12, the control unit 15 resets the timer tc to zero (tc=0) and starts it.

At a step S102, the control unit 15 reads the engine rotation speed Ne and the turbine rotation speed Nt.

At a step S103, the control unit 15 sets the engine rotation speed Nes at the time just before the starting operation and the turbine rotation speed Nts at the time just before the starting operation.

At a step S104, the control unit 15 calculates the target engagement time $\Delta$t1 by using the equation $\Delta$t1=A/Nes, wherein A is a constant indicative of a time period corresponding to the one cycle (intake process, compression process, and explosion process) of the engine.

At a step S105, the control unit 15 reads the turbine rotation speed Nt again.

At a step S106, the control unit 15 decides as to whether the turbine rotation speed Nt is nearly zero or not (Nt~0?). When the decision at the step S106 is NO, that is, when the forward clutch 12 is now engaging, the routine proceeds to a step S107. When the decision at the step S106 is YES (Nt~0), the routine proceeds to a step S111.

At a step S107, the control unit 15 calculates a turbine rotation speed control target Ntt by the following equation (2).

$$Ntt=Nts-(Nts/\Delta t1)\times tc \qquad (2)$$

At a step S108, the control unit 15 calculates a difference $\Delta$Nt between the turbine rotation speed Nt and the turbine rotation speed control target Ntt ($\Delta$Ntt=Nt−Ntt).

At a step S109, the control unit 15 calculates the OPM electric current $i_x$ by the equation $i_x=i_x+K\times\Delta Nt$.

After the execution of the step S109, the routine returns to the step S105. That is, as far as the forward clutch is now engaging, the routine repeats the steps S105, S106, S107, S108 and S109. During the execution of the step S107, the control unit 15 functions as a decrease change ratio setting means.

Next, the manner of operation of the third embodiment according to the present invention will be discussed hereinafter with reference to the graphs of FIGS. 13A to 13D.

The third embodiment is arranged to sequentially execute the determination of the forward-clutch hydraulic pressure by the feedback control instead of the determination of the target shelf pressure executed in the first embodiment. That is, when the starting operation such as the turning ON of the acceleration, the turning OFF of the idle switch and the turning OFF of the brake switch is executed at the moment t11, counting of the timer tc is started by the execution of the step S102 in FIG. 12. Then, the engine rotation speed Nes at a time just before the moment t11 and the turbine rotation speed Nes at the time just before the moment t11 are set by the execution of the step S103, and the target engagement time Δt1 is set on the basis of the engine rotation speed Nes by the execution at the step S104. Further, the turbine rotation speed control target Ntt is obtained by the calculation of Ntt=Nts−(Nts/Δt1)×tc through the execution of the step S107, and the forward clutch hydraulic pressure is control by the OPM electric current $i_x$ calculated by the equation $i_x=i_x+K \times \Delta Nt$ at the step S109 on the basis of the difference ΔNt obtained at the step S108.

Figure 13A:
FIGS. 13A to 13D are time charts for explaining the manner of operation of the third embodiment.
Figure 13B:
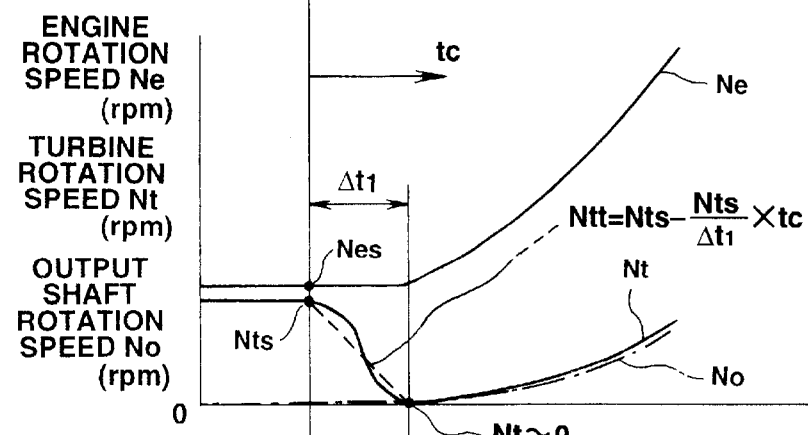
Figure 13C:
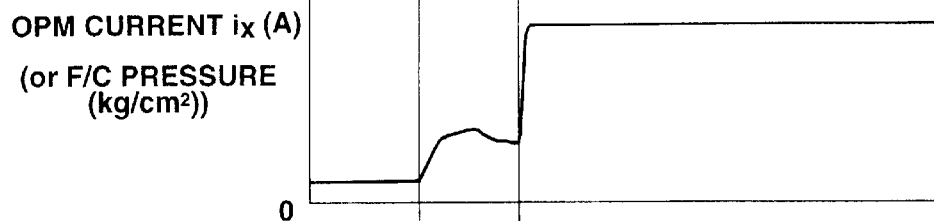
Figure 13D:
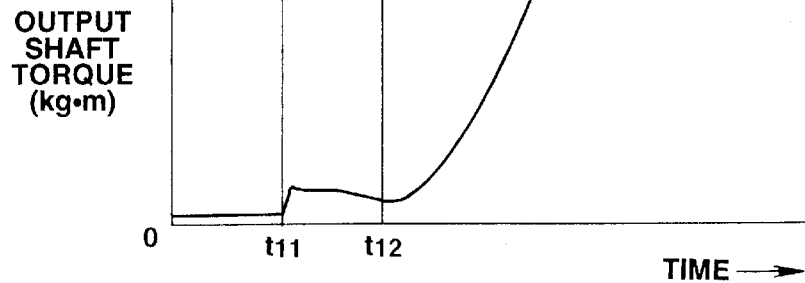

Since the change ratio is set in the third embodiment such that the turbine rotation speed Nt=Nts at the moment t11 becomes zero at the time when the timer period Δt1 is elapsed in the calculation of the turbine rotation speed control target Ntt, the turbine rotation speed control target Ntt changes to form the dotted straight line between Nt=Nts at the moment t11 and Nt~0 at the moment t12 as shown in FIG. 13B. Therefore, by the feedback control using the turbine rotation speed Ntt, the forward clutch hydraulic pressure corresponding to the OPM electric current $i_x$ forms a wave form shown in FIG. 13C. The wave form of the forward clutch hydraulic pressure is generally similar to that shown in FIG. 7C in the first embodiment.

With the thus arranged third embodiment of the anti-creep control apparatus according to the present invention, it becomes possible to respond to various deviation such as the deviation of the friction coefficient μ of the forward clutch or the deviation of the output value of the OPM electric current by the execution of the feedback control. Therefore, it becomes possible to ensure a desired characteristic for full engagement of the forward clutch 12 at the moment t12, which is elapsed Δt1 from the moment t11 as shown in FIGS. 13A to 13D.

The entire disclosure of Japanese Patent Application No. 8-173447 filed on Jul. 3, 1996 including specification, claims, drawings and summary are incorporated herein by reference in its entirety.

What is claimed is:

1. An anti-creep control apparatus for an automatic transmission, which includes a torque converter connected to an engine and a friction element engageable during a drive range of the automatic transmission, said anti-creep control apparatus comprising:
   an engine output detecting means for detecting whether an engine throttle valve is opening from an idle position;
   an engine rotation speed detecting means for detecting a rotation speed of the engine;
   an output rotation speed detecting means for detecting a rotation speed of an output shaft of the torque converter;
   a target engagement time setting means for setting a target engagement time that is in inverse proportion to the engine rotation speed when said engine output detecting means detects that the engine throttle valve is opening from the idle position; and
   an engagement force control means for controlling an engagement force of the friction element so that either a slipping amount of the friction element or the output shaft rotation speed of the torque converter becomes nearly zero as said set target engagement time elapses.

2. An anti-creep control apparatus as claimed in claim 1, wherein the engagement force of the friction element is controlled by a controlled hydraulic pressure Pc, which is determined by the following equation:

$$Pc=(It \times Nts/\Delta t1+ts \times \tau s \times Nes^2) \times B+C,$$

wherein It is a turbine inertia of the automatic transmission, Nts is the torque converter output shaft rotation speed when said target engagement time is set, Δt1=A/Nes, which is said set target engagement time, ts is a stall torque ratio of the torque converter, τs is a stall torque capacity coefficient of the torque converter, Nes is the engine rotation speed when said target engagement time is set, and A, B, and C are constants.

3. An anti-creep control apparatus as claimed in claim 2, further comprising an engagement time detecting means for detecting an amount of time for either the slipping amount of the friction element or the output shaft rotation of the torque converter to become zero from when said target engagement time is set, said engagement force control means decreasing the controlled hydraulic pressure Pc by a predetermined value when the amount of time detected by said engagement time detecting means is smaller than an allowable range of said set target engagement time, said engagement force control means increasing the controlled hydraulic pressure Pc by a predetermined value when the amount of time detected by said engagement time detecting means is greater than the allowable range of said set target engagement time.

4. An anti-creep control apparatus as claimed in claim 2, wherein the allowable range of said set target engagement time is from 80% to 100% of said set target engagement time.

5. An anti-creep control apparatus as claimed in claim 1, wherein said engagement force control means includes an oil pressure modulator for adjusting a hydraulic pressure to control the engagement force of the friction element, said oil pressure modulator increasing the hydraulic pressure by a predetermined target shelf pressure after a said target engagement time is set.

6. An anti-creep control apparatus for an automatic transmission, which includes a torque converter connected to an engine and a friction element engageable during a drive range, said anti-creep control apparatus comprising:
   an engine output detecting means for detecting whether an engine throttle valve is opening from an idle position;
   an engine rotation speed detecting means for detecting a rotation speed of the engine;
   an output rotation speed detecting means for detecting a rotation speed of an output shaft of the torque converter;
   a target engagement time setting means for setting a target engagement time that is in inverse proportion to the engine rotation speed after when said engine output detecting means detects that the engine throttle valve is opening from the idle position; and
   an engagement force control means for controlling an engagement force of the friction element so that either a slipping amount of the friction element or the torque converter output shaft rotation speed becomes nearly zero as said set target engagement time elapses,
   wherein said engagement force control means includes a feedback control for changing the engagement force of the friction element based on the torque converter output shaft rotation speed and said set target engagement time.

7. An anti-creep control apparatus as claimed in claim 6, wherein said engagement force control means controls the engagement force of the friction element by controllably applying hydraulic pressure to the friction element such that a difference between an actual rotation speed of the torque converter output shaft and a control target rotation speed of the torque converter output shaft is controlled to nearly zero.

8. An anti-creep control apparatus as claimed in claim 7, wherein said engagement force control means calculates the control target rotation speed Ntt of the torque converter output shaft by the following equation:

$$Ntt = Nts - (Nts/\Delta t1) \times tc,$$

wherein Nts is the torque converter output shaft speed when said target engagement time is set, $\Delta t1 = A/Nes$, which is said set target engagement time, tc is an amount of time elapsed from when said target engagement time is set, Nes is an engine rotation speed when said target engagement time is set, and A is a constant.

9. An anti-creep control apparatus for an automatic transmission, comprising:
 a torque converter adapted to be connected to an engine;
 a forward clutch engageable during a drive range of the automatic transmission;
 an oil pressure modulator for adjusting hydraulic pressure supplied to said forward clutch;
 a sensor unit for detecting whether an engine throttle valve is opening from an idle position, an engine rotation speed, and an output shaft rotation speed of said torque converter; and
 a control unit for setting a target engagement time that is in inverse proportion to the engine rotation speed when said engine output detecting means detects that the engine throttle valve is opening from the idle position,
 wherein said control unit controls said oil pressure modulator so that either a slipping amount of said forward clutch or the torque converter output shaft rotation speed becomes nearly zero as said set target engagement time elapses.

* * * * *